July 24, 1951 B. M. LEECE ET AL 2,561,804
ELECTRICAL GENERATING SYSTEM CONTROL
Filed Feb. 10, 1947 2 Sheets-Sheet 1
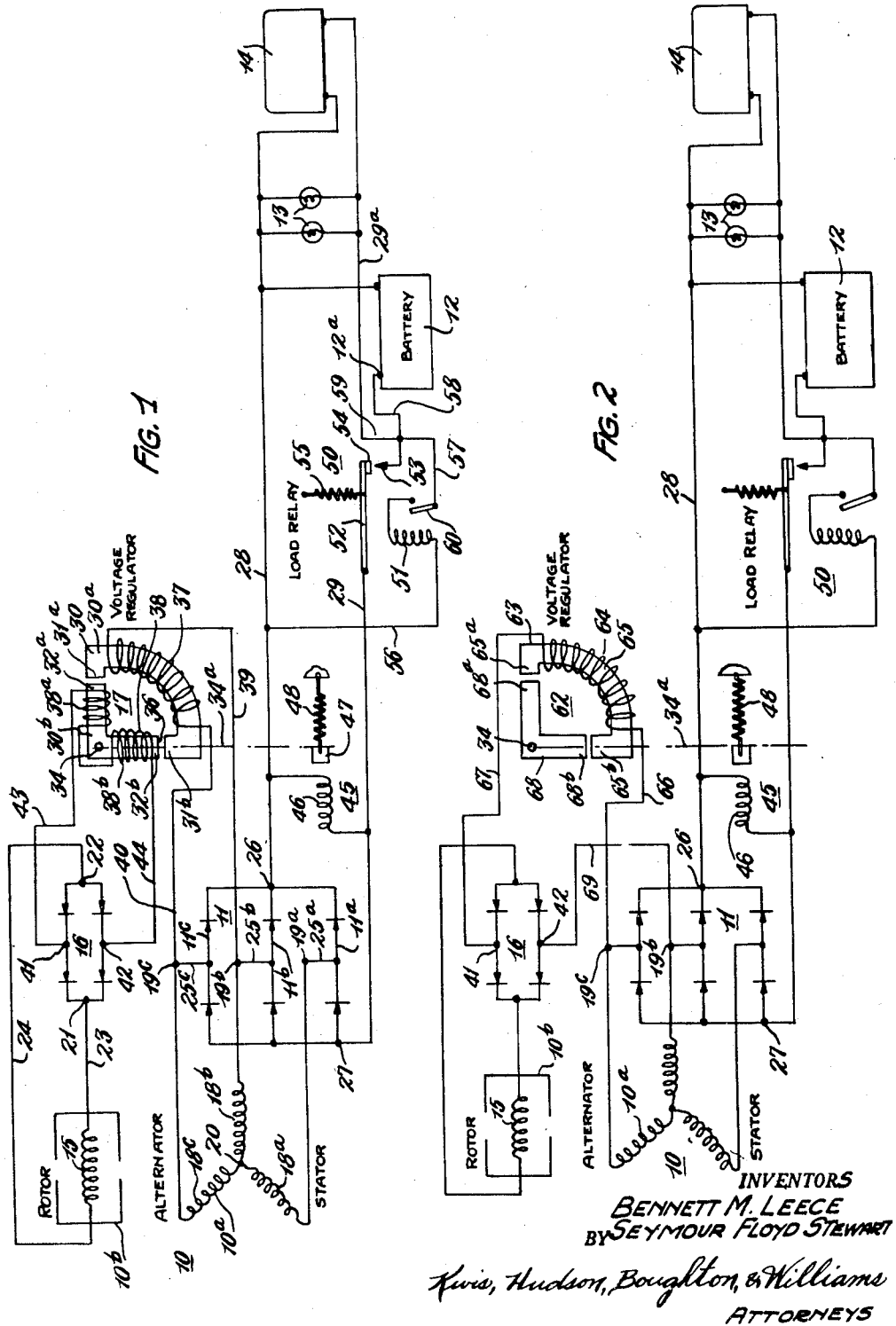
INVENTORS
BENNETT M. LEECE
BY SEYMOUR FLOYD STEWART
Kwis, Hudson, Boughton, & Williams
ATTORNEYS July 24, 1951    B. M. LEECE ET AL    2,561,804
ELECTRICAL GENERATING SYSTEM CONTROL
Filed Feb. 10, 1947    2 Sheets-Sheet 2
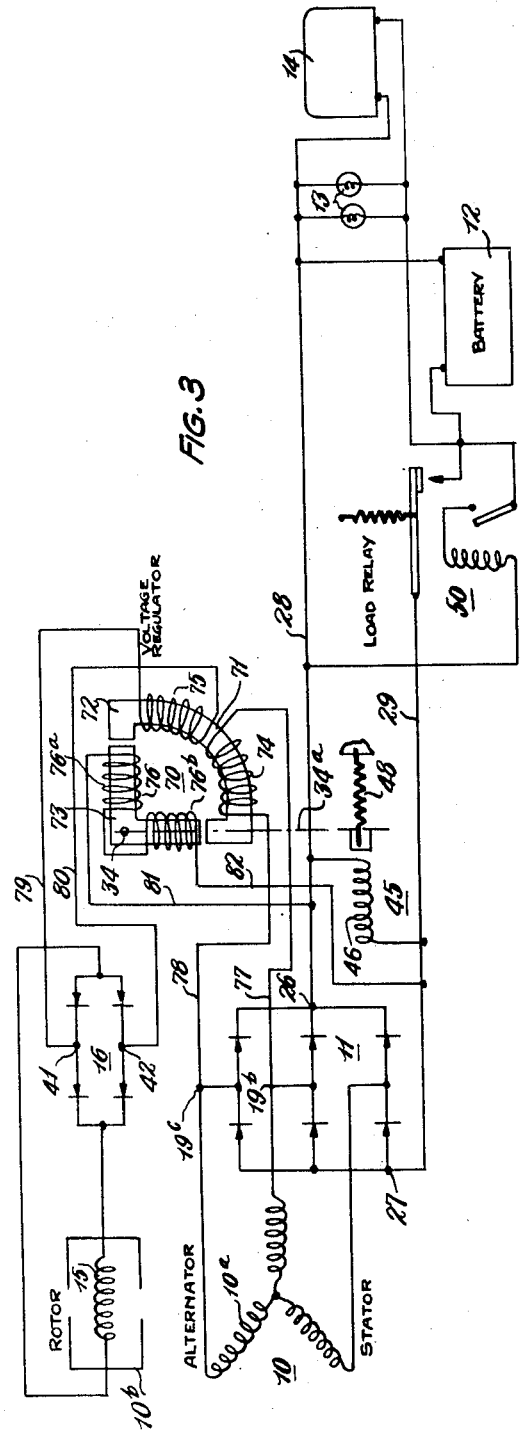
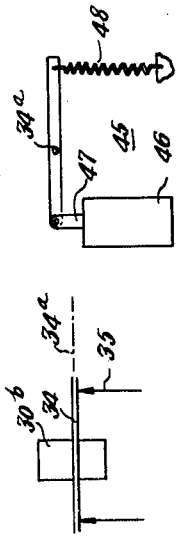
INVENTORS
BENNETT M. LEECE
BY SEYMOUR FLOYD STEWART
Kwis, Hudson, Boughton & Williams
ATTORNEYS Patented July 24, 1951

2,561,804

UNITED STATES PATENT OFFICE 2,561,804

ELECTRICAL GENERATING SYSTEM CONTROL

Bennett M. Leece and Seymour Floyd Stewart, Shaker Heights, Ohio, assignors to The Leece-Neville Company, Cleveland, Ohio, a corporation of Ohio Application February 10, 1947, Serial No. 727,666

2 Claims. (Cl. 322—28)

This invention relates to electric generating systems and, as one of its objects, aims to provide a novel electrical system embodying an alternator and a main rectifier for delivering rectified electric current, and also embodying a novel voltage regulating means for controlling the terminal voltage of the rectifier current being delivered. The invention is susceptible of various embodiments and can be applied to various different uses but is particularly well suited for vehicle electrical systems of the kind including a storage battery to be charged, or other direct current load, and in which the alternator is driven by a variable speed vehicle driving engine.

Another object of the present invention is to provide an improved electrical system of the character mentioned, in which the alternator is self-excited by rectified current and the excitation of the field winding is automatically varied by the voltage regulating means.

Still another object is to provide a novel form of voltage regulator for use with a self-excited alternator and which is of a simple construction and adapted to operate in an efficient and reliable manner.

A further object is to provide improved electrical apparatus of the character mentioned, in which the voltage regulator is of the inductor type and includes a winding which is connected with the field winding of the alternator through an auxiliary rectifier.

This invention also provides improved electrical apparatus of this character, in which the inductor type voltage regulator has relatively movable core members for varying the reluctance of the magnetic circuit and wherein a voltage responsive magnet connected with the direct current load terminals of the main rectifier produces the relative movement between the core members.

Yet another object is to provide improved electrical apparatus of the kind mentioned, in which the inductor type voltage regulator has a primary winding energized from the alternating current terminals of the alternator and a secondary winding which is connected with the field winding through the auxiliary rectifier.

It is a further object of this invention to provide improved electrical apparatus of the character referred to in which the voltage regulator is a variable reactor device having an alternating current winding energized from the alternator and connected with the field winding through the auxiliary rectifier and also having a core member which is movable for varying the magnetic reluctance and is adapted to be shifted by a voltage responsive magnet connected across the direct current terminals of the main rectifier.

Other objects and advantages of the invention will be apparent from the following description and the accompanying sheets of drawings in which Fig. 1 is a wiring diagram illustrating an electrical system embodying the present invention;

Fig. 2 is a similar wiring diagram but showign a modified form of the apparatus;

Fig. 3 is another such wiring diagram showing still another form of the invention; and Figs. 4 and 5 are diagrammatic detail views further illustrating the voltage regulator.

The electrical system which is illustrated in Fig. 1 as one embodiment of this invention comprises, in general, an alternator 10 and a main rectifier 11 through which the alternator is connected with a direct current load to be supplied. The alternator can be driven by any appropriate power device such as a variable speed vehicle driving engine. The direct current load is here shown, by way of example, as consisting of a storage battery 12, lamps 13 and a radio apparatus 14. The alternator 10 comprises a stator 10a, to be further described hereinafter, and a rotor 10b carrying a field winding 15. The alternator is self-excited and, for this purpose, exciting current is supplied to the field winding 15 through an auxiliary single phase rectifier 16. The system also includes a voltage regulating device 17 which automatically regulates the excitation of the field and thereby controls the terminal voltage delivered by the alternator.

Before proceeding with the more detailed description of the improved system, it is considered advisable to explain briefly at this point an important difference between this improved system and the vehicle electrical systems heretofore used and in which a direct current generator is driven by the vehicle engine. In the improved system the alternator 10 is of a type adapted for satisfactory operation through a wide range of speeds which may include a maximum speed of 12,000 R. P. M. or higher. Because of this characteristic of the alternator the pulley ratio between the crankshaft and alternator can be relatively high so as to give a desired electrical output for the lower engine speeds with little or no regard for the top speed at which the alternator may be driven when the engine is operating at its maximum R. P. M. This is in direct contrast to previous vehicle electrical systems embodying a direct current generator for the reason that in those systems such a high pulley ratio would have been impractical if not impossible because of the high reactance voltage developed at the extreme generator speeds and because of the rapid brush wear and damage which would occur to the commutator and other armature parts for such extreme generator speeds. This comparison points out the important advantage of the improved system in being able to deliver a high electrical output for the lower operating speeds of the vehicle engine and which output will be adequate for the storage battery, or other direct current load to be supplied, and can be obtained without damage to any of the parts of the system when the vehicle engine is required to operate at its higher or maximum speeds.

The alternator 10 can be either single phase or polyphase, such as the three phase machine here shown, and can be of any construction suitable for the type of service above indicated. In this instance the stator 10a is shown as having a so-called star-connected inductors winding composed of the coils or coil sections 18a, 18b and 18c. The alternator also has alternating current terminals 19a, 19b and 19c with which the outer ends of the inductor coils 18a, 18b and 18c are connected, respectively. The inner ends of these coils have a common connection 20 as is usual in generating machines of this kind.

The rotor 10b which carries the field winding 15 may be of any suitable construction including an appropriate body or poles of magnetic material and is suitably supported for rotation in the stator 10a. The field winding 15 has its opposite ends connected with the direct current terminals 21 and 22 of the auxiliary rectifier 16 by the conductors 23 and 24. The connections of the conductors 23 and 24 with the ends of field winding 15 can be made by the use of any suitable brush means, such as that disclosed in copending application Serial No. 670,888, filed May 20, 1946, now abandoned, and which permits operation of the alternator 10 in either direction of rotation.

The main rectifier 11 may be of any construction suitable for the use of this rectifier in the improved system and is here shown as being a three phase full wave dry-plate rectifier of the bridge type. The circuit of the rectifier 11 includes the three arms or branches 11a, 11b and 11c with which the alternating current terminals 19a, 19b and 19c of the stator windings 18a, 18b and 18c are connected by the connections 25a, 25b, and 25c, respectively. The rectifier 11 also has direct current terminals 26 and 27 with which the load conductors 28 and 29 are connected for supplying the external load.

The voltage regulator 17 is of the inductor type and embodies a novel construction which will now be described. This regulator is provided with a laminated iron core 30 comprising stationary and movable core sections 30a and 30b which cooperate with each other in defining a magnetic path or circuit of variable reluctance. The stationary core member or stator 30a is here shown as being an arcuate member having pole portions 31a and 31b at the ends thereof and which extend in converging substantially right angular relation to each other. The movable core member or rotor 30b is here shown as being a body of angular shape having pole portions 32a and 32b extending in diverging substantially right angular relation to each other and adapted to occupy positions substantially opposite the pole portions 31a and 31b of the stationary core member 30a such that these core members define a substantially closed-loop iron-path magnetic circuit. The core member 30b is carried by a pivot member 34 which is mounted on suitable bearings 35 so that swinging of this core member about the axis of the pivot will shift the pole portion 32a and 32b into or out of alignment with the pole portions 31a and 31b. Such relative shifting between the pole portions varies the reluctance of the magnetic circuit formed by the core members 30a and 30b.

In Fig. 1 of the drawings the voltage regulator 17 is shown as having primary winding or coil 37 on the stationary core member 30a and a secondary winding 38 comprising coil sections 38a and 38b surrounding the arms of the movable core member 30b. The primary winding 37 is an alternating current coil whose ends are connected with one pair of the alternating current terminals of the alternator 10, in this instance the terminals 19b and 19c, by means of the conductors 39 and 40. The secondary winding comprising the coil sections 38a and 38b has its ends connected with the alternating current terminals 41 and 42 of the auxiliary rectifier 16 by the conductors 43 and 44.

With the construction just described above for the voltage regulator 17 it will be seen that this device is capable of functioning as a transformer having the winding 37 as its primary winding and the coil sections 38a and 38b as its secondary winding. Since the primary winding 37 is energized directly from the alternating current terminals of the alternator 10, the magnetization of the core 30 will be varied directly with changes in the alternating current terminal voltage of the alternator such as would result from changes in the speed at which the alternator is driven. The current induced in the secondary winding 38 of the regulator will likewise vary correspondingly and since this secondary winding is connected with the field winding 15 of the alternator and supplies current thereto through the auxiliary rectifier 16, the field strength of the alternator will depend upon the transformer action of the regulator.

The voltage regulator 17 also includes a magnet 45 having an energizing coil 46 and a movable armature 47 which is connected with the shaft extension 34a of the pivot 34. The energizing coil 46 is a voltage responsive coil having its ends connected to the load conductors 28 and 29, that is to say, this coil is connected across the direct current terminals 26 and 27 of the main rectifier 11. A tension spring 48 connected with the armature 47 normally holds the core member 30b in the position shown in Fig. 1 in which its pole portions 32a and 32b are in alignment with the pole portions 31a and 31b of the stationary core member 30a. When the core members are in this relative position the reluctance of the magnetic circuit is a minimum and the transformer action will be a maximum, and hence, the current which will then be supplied to the field winding 15 will also be a maximum which is desirable for the starting or lower operating speeds of the alternator.

When the speed of the alternator increases and the voltage at its alternating current terminals and at the direct current terminals of the main rectifier 11 tends to increase, the resulting increased energization of the magnet 45 will cause the core member 30b to be rocked about the axis of its pivot 34 in opposition to the spring 48, thereby moving the pole portions 32a and 32b out of alignment with the pole portions 31a and 31b of the stationary core member 30a and thus increasing the reluctance of the magnet circuit of the core. Thereupon the current supplied to the field winding 15 by the secondary 38 of the voltage regulator will be decreased and the terminal voltage of the alternator will decrease correspondingly. The spring 48 acts to return the pole portions 32a and 32b of the core member 30b to a position of alignment with the pole portions 31a and 31b and in this manner the magnet 45 acts to automatically vary the reluctance of the magnetic circuit of the core 30 and the voltage regulator automatically controls the terminal voltage of the alternator 10 in an efficient and satisfactory manner for all operating speeds at which the alternator is driven.

The load circuit provided by the conductors 28 and 29 preferably includes a load relay 50 by which the external load can be automatically connected or disconnected from the alternator 10. This load relay comprises a magnet coil 51 and a movable armature 52 adapted to be actuated by the coil. The relay also includes stationary and movable cooperating contacts 53 and 54 of which the movable contact is carried by the armature 52. A tension spring 55 acts on the armature 52 to normally urge the movable contact 54 away from the stationary contact 53. The magnet winding 51 has one end thereof connected with the load conductor 28 by the connection 56 and its other end connected with the terminal 12a of the storage battery by the conductors 57 and 58 and with the remote portion 29a of the other load conductor by the connection 59.

The energizing circuit for the magnet coil 51 also includes a switch 60 which, if desired, may also be the ignition switch of the motor vehicle on which this improved electrical system is being used. When the switch 60 is closed the magnet coil 51 of the load relay 50 will be energized to cause closing of the relay contacts 53 and 54 to thereby complete the external load circuit of the alternator and when the switch 60 is opened to deenergize the load relay the contacts 53 and 54 will be opened by the spring 55 to disconnect the battery from the alternator.

Fig. 2 of the drawings shows a modified form of the above described electrical system in which the construction of the voltage regulator 62 differs from the voltage regulator 17 in that the iron core 63 is provided with only a single alternating current winding 64. The winding 64 is located on the stationary core member 65 and has one end thereof connected with the alternating current terminal 19c of the alternator 10 by the conductor 66 and its other end connected with the alternating current terminal 41 of the auxiliary rectifier 16 by the conductor 67. The movable core member 68 is mounted for rocking movement by a pivot 34 and is adapted to be shifted by the voltage responsive magnet 45 for varying the reluctance of the core 63 and the excitation of the field winding 15.

This modified form of voltage regulator 62 acts as a variable iron core reactor in which the winding 64 forms the reactance coil. This winding is continuously energized from the alternator 10 and supplies current to the field winding 15 through the conductor 67 and the auxiliary rectifier 16. A conductor 69 extending between the alternating current terminal 42 of the auxiliary rectifier 16 and the terminal 19b of the alternator completes the other side of the circuit.

The normal position of the core member 68, as well as its position for starting or low speed operation of the alternator 10, is with its pole portions 68a and 68b out of alignment with the pole portions 65a and 65b of the stationary core member 65 and the movable core member is urged toward this position by the spring 48 of the magnet 45. At this time the reluctance of the magnetic circuit will be at a maximum value and the reactance of the winding 64 will be at minimum value, and hence, a relatively large exciting current will be supplied through this winding and through the auxiliary rectifier 16 to the field winding 15.

When the terminal voltage of the alternator increases, the magnet 45 will shift the movable core member 68 against the action of the spring 48 and relative to the stationary core member 65 thereby tending to bring the pole portions of the core members into alignment with each other. The reluctance of the magnetic circuit is thereby decreased resulting in an increased E. M. F. being induced in the reactance coil 64 which opposes the impressed voltage from the alternator and consequently the exciting current being supplied to the field winding 15 will be decreased. When the terminal voltage of the alternator decreases and the core member 68 is shifted by the spring 48 to increase the reluctance of the magnetic circuit, the self-inductance of the reactor winding 64 will be reduced and the exciting current then supplied to the field winding 15 will be correspondingly increased. This automatic variation in the value of the reactance afforded by the regulator 62 enables this device to control the field excitation and thereby automatically regulate the terminal voltage of the alternator.

Fig. 3 of the drawings shows another form of the improved system in which a voltage regulator 70 of still another construction is employed. The voltage regulator 70 includes an iron core 71 which is similar to the core 30 in that it comprises stationary and movable sections 72 and 73. The stationary core member 72 is provided with primary and secondary windings 74 and 75 and the movable core member 73 is provided with a control winding 76 having sections 76a and 76b carried by the two legs of this core member. The primary winding 74 has its ends connected with the alternating current terminals 19b and 19c of the alternator by the conductors 77 and 78. The secondary winding 75 has its ends connected with the alternating current terminals 41 and 42 of the auxiliary rectifier 16 by means of the conductors 79 and 80. The control winding 76 is a voltage response winding which is connected across the direct current terminals 26 and 27 of the main rectifier 11 by the conductors 81 and 82. The movable core member 73 is mounted for swinging about the axis of a pivot 34 in the manner of the core member 30b above described and is adapted to be shifted by the voltage responsive magnet 45 so as to vary the reluctance of the magnetic circuit.

Disregarding, for the moment, the winding 76 and its function it will be seen that the windings 74 and 75 have a transformer action similar to that of the windings of the regulator 17 of Fig. 1 and that this transformer action will be varied in accordance with variations produced in the reluctance of the magnetic circuit by the shifting of the movable core member 73. The normal position for the core member 73 is with its pole portions in alignment with the pole portions of the stationary core member 72 at which time the reluctance of the magnetic circuit is a minimum and a full transformer action will cause a full field current to be delivered through the auxiliary rectifier 16 to the field winding 15 by the secondary 75. When the magnet 45 shifts the core member 73 to decrease the transformer action the current supplied to the field winding will be decreased correspondingly and when this core member is shifted back by the spring 48 to increase the transformer action the field current will be increased.

Since the control winding 76 is connected across the direct current load terminals 26 and 27 of the main rectifier 11, it is directly responsive to variations in the direct current terminal output voltage of the alternator. When the direct current voltage is at a maximum and the magnetic circuit is closed so as to have minimum reluctance, the flux produced by the control winding 76 saturates the magnetic circuit and thereupon little or no transformer action takes place between the primary and secondary windings 74 and 75. This results in a decrease in the excitation of the field winding 15. As the direct current output voltage drops, the flux generated by the control winding 76 also decreases and the pulsating flux generated by the primary winding 74 will then predominate and the transformer action between the windings 74 and 75 is restored or partially restored. Consequently, the action of the control winding 76 will be to reduce the field excitation when the terminal voltage attempts to rise and, conversely, will tend to increase the field excitation when the terminal voltage begins to fall.

From the construction of the regulator 70 and its functioning as thus far described above, it will be seen that the normal position of the movable core member 73 is that shown in Fig. 3 and occurs when the voltage across the direct current terminals 26 and 27, and hence the effectiveness of the control coil 76, is a minimum so as to permit full transformer action at this time to provide full excitation for the field winding 15. When the voltage across the load terminals 26 and 27 approaches or reaches a maximum value, the saturating effect of the direct current flux produced by the control winding 76 and the action of the movable core member 73 in tending to increase the magnetic reluctance work together to produce a very effective control of the voltage of the alternator.

It will now be readily understood from the foregoing description and the accompanying drawings that this invention provides an improved electrical system and a novel voltage regulating means which are well suited for use on motor vehicles having a variable speed driving engine and will provide a high electrical output for the lower engine speeds without causing any of the apparatus to be subjected to damage or harmful operating conditions during the higher operating speeds of the vehicle engine. It will also be seen that with this improved system the alternator 10 can be operated in either direction of rotation and the functioning of the system will be exactly the same for both directions of rotation. This is an advantage of importance in marine and railway vehicles and in various other vehicles in which the driving means is reversible. It will also be seen that the novel voltage regulating means of the improved system will function efficiently and automatically to maintain a substantially constant terminal or output voltage for the alternator for substantially all speeds at which the alternator is driven.

Although the improved electrical system and voltage regulating means of this invention have been illustrated and described herein to a detailed extent, it will be understood of course that the invention is not to be regarded as being limited correspondingly in scope but includes all changes and modifications coming within the terms of the appended claims.

Having thus described our invention, we claim:

1. In an electrical generating system for vehicles having a variable speed driving motor, an alternator adapted to be driven by said motor and having alternating current terminals and a field winding, a rectifier connected with said alternating current terminals and itself having direct current load terminals, a direct current external load circuit connected with said load terminals and constituting the main load for said alternator, a second rectifier, a field circuit including said field winding and said second rectifier, a core comprising core members forming a substantially closed-loop iron-path magnetic circuit and one of which core members is movable relative to the other for varying the reluctance of the magnetic circuit, windings on one of said core members including a primary winding connected with said alternating current terminals and a secondary winding connected with said field winding through said field circuit and said second rectifier, a control winding on the other core member and connected across said direct current terminals, and a magnet having a voltage coil connected across said direct current terminals and an armature responsive to said voltage coil and mechanically connected with the movable core member for imparting movement to the latter.

2. In an electrical generating system for vehicles having a variable speed driving motor, an alternator adapted to be driven by said motor and having alternating current terminals and a field winding, a rectifier connected with said alternating current terminals and itself having direct current load terminals, a direct current external load circuit connected with said load terminals and constituting the main load for said alternator, a second rectifier, a field circuit including said field winding and said second rectifier, a core comprising core members forming a substantially closed-loop iron-path magnetic circuit and one of which core members is movable relative to the other for varying the reluctance of the magnetic circuit, windings on one of said core members including a primary winding connected with said alternating current terminals and a secondary winding connected with said field winding through said field circuit and said second rectifier, a control winding on the other core member and connected across said direct current terminals, a magnet having a voltage coil connected across said direct current terminals and an armature responsive to said voltage coil and mechanically connected with the movable core member for imparting movement to the latter, and a spring urging said movable core member toward a position in which the reluctance of said magnetic circuit is such as to afford maximum excitation for said field winding.

BENNETT M. LEECE.
SEYMOUR FLOYD STEWART.

REFERENCES CITED

The following references are of record in the file of this patent:

UNITED STATES PATENTS

| Number | Name | Date |
|---|---|---|
| 1,710,755 | West | Apr. 30, 1929 |
| 2,486,377 | Abbott | Nov. 1, 1949 |

FOREIGN PATENTS

| Number | Country | Date |
|---|---|---|
| 79,440 | Sweden | July 22, 1932 |